(12) United States Patent
Wynn et al.

(10) Patent No.: US 12,269,319 B2
(45) Date of Patent: Apr. 8, 2025

(54) VEHICLE HUMIDIFICATION ASSEMBLY

(71) Applicants: Antonio Wynn, Southaven, MS (US); Tammy Wynn, Southaven, MS (US)

(72) Inventors: Antonio Wynn, Southaven, MS (US); Tammy Wynn, Southaven, MS (US)

( * ) Notice: Subject to any disclaimer, the term of this patent is extended or adjusted under 35 U.S.C. 154(b) by 378 days.

(21) Appl. No.: 17/860,469

(22) Filed: Jul. 8, 2022

(65) Prior Publication Data
US 2024/0010052 A1    Jan. 11, 2024

(51) Int. Cl.
*B60H 3/02* (2006.01)
*B01F 23/21* (2022.01)
*B01F 23/213* (2022.01)

(52) U.S. Cl.
CPC ........... *B60H 3/022* (2013.01); *B01F 23/213* (2022.01); *B01F 23/2133* (2022.01)

(58) Field of Classification Search
CPC ..................... B01F 23/213; B01F 23/2133
See application file for complete search history.

(56) References Cited

U.S. PATENT DOCUMENTS

| 5,400,608 | A | 3/1995 | Steed |
| 10,336,160 | B2 | 7/2019 | Vergamini |
| 10,792,983 | B2 | 10/2020 | Daniel |

FOREIGN PATENT DOCUMENTS

| EP | 3607988 A1 | * | 2/2020 | ........ A61M 16/0003 |
| JP | 2512982 B2 | * | 9/1999 | |
| JP | 2008254638 A | * | 10/2008 | |
| WO | WO2015023127 | | 2/2015 | |

* cited by examiner

*Primary Examiner* — Robert A Hopkins

(57) ABSTRACT

A vehicle humidification assembly for humidifying a cabin of a vehicle includes a vehicle has a cabin and an air conditioning system. A humidification unit is positioned in the vehicle and the humidification unit vaporizes a fluid when the humidification unit is turned on. The humidification unit is in fluid communication with the air conditioning system in the vehicle for humidifying an interior of the cabin. In this way the humidification unit can enhance comfort for a driver of the vehicle. A control is positioned within the cabin such that the control is accessible to the driver. The control is in communication with the humidification unit for turning the humidification unit on and off.

8 Claims, 5 Drawing Sheets

VEHICLE HUMIDIFICATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to humidification devices and more particularly pertains to a new humidification device for humidifying a cabin of a vehicle. The device includes a humidification unit that is positioned in the engine bay of a vehicle and which is in communication with an air conditioning system of the vehicle. The humidification unit releases vaporized water into the air conditioning system to humidify the cabin of the vehicle.

(2) Description of Related Art Including Information Disclosed Under 37 CFR 1.97 and 1.98

The prior art relates to humidification devices including a humidity control system for controlling the humidity of air confined within a container. The prior art discloses a vehicular cooling system that includes a cooling unit with employed an evaporative media saturated with water to cool air being drawn through the evaporative media. The prior art discloses a vehicle humidification unit that releases humidified air into a cabin of a vehicle and a sensor positioned within the vehicle that actuates the humidification unit when the humidity in the vehicle falls to a trigger level. The prior art discloses a vehicle air conditioning system that includes a humidification device. The prior art discloses a vehicle humidification device that employs hydrolysis to form a water vapor to humidify a cabin of a vehicle.

BRIEF SUMMARY OF THE INVENTION

An embodiment of the disclosure meets the needs presented above by generally comprising a vehicle has a cabin and an air conditioning system. A humidification unit is positioned in the vehicle and the humidification unit vaporizes a fluid when the humidification unit is turned on. The humidification unit is in fluid communication with the air conditioning system in the vehicle for humidifying an interior of the cabin. In this way the humidification unit can enhance comfort for a driver of the vehicle. A control is positioned within the cabin such that the control is accessible to the driver. The control is in communication with the humidification unit for turning the humidification unit on and off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
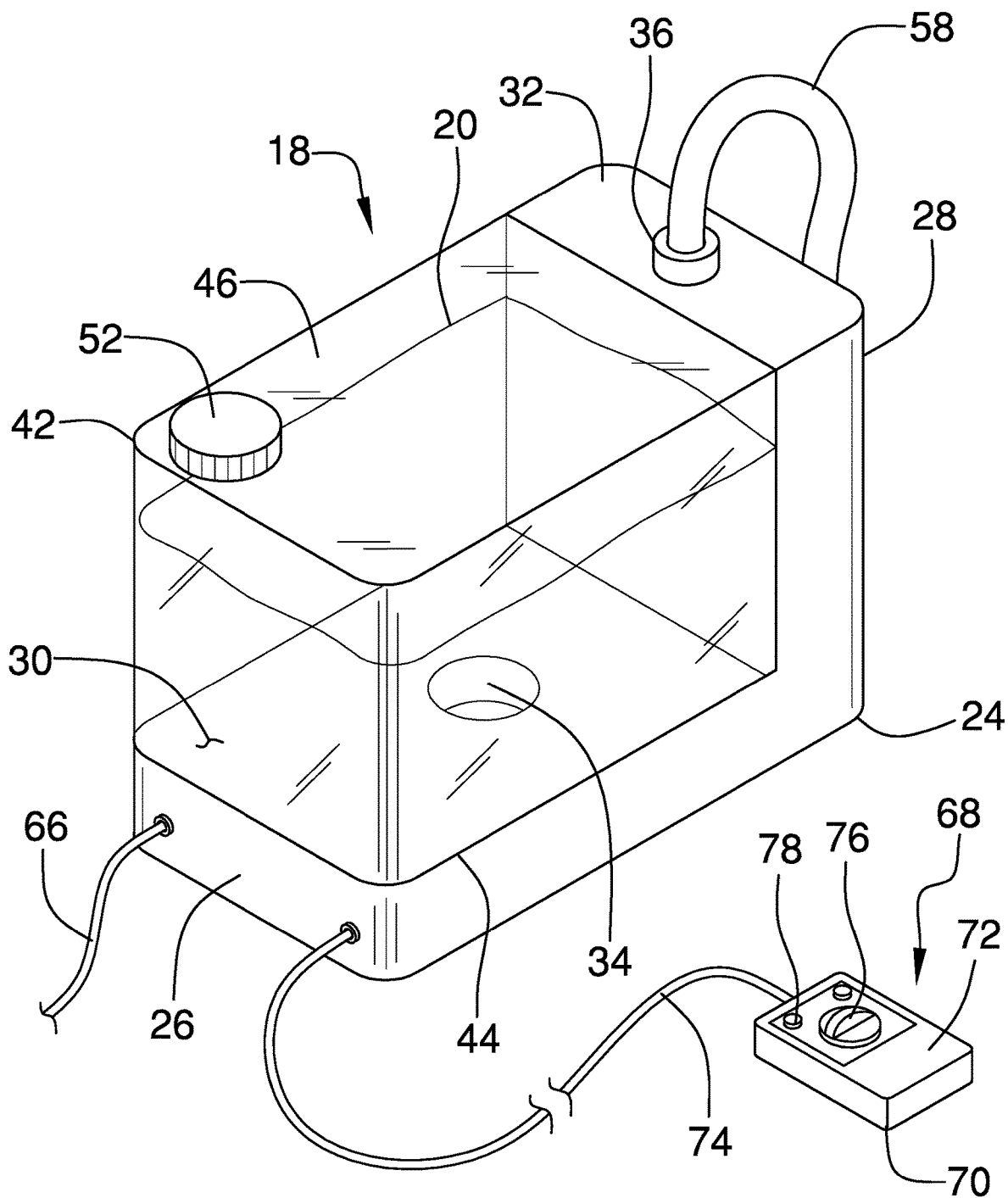
FIG. 1 is a perspective view of a vehicle humidification assembly according to an embodiment of the disclosure.
Figure 2:
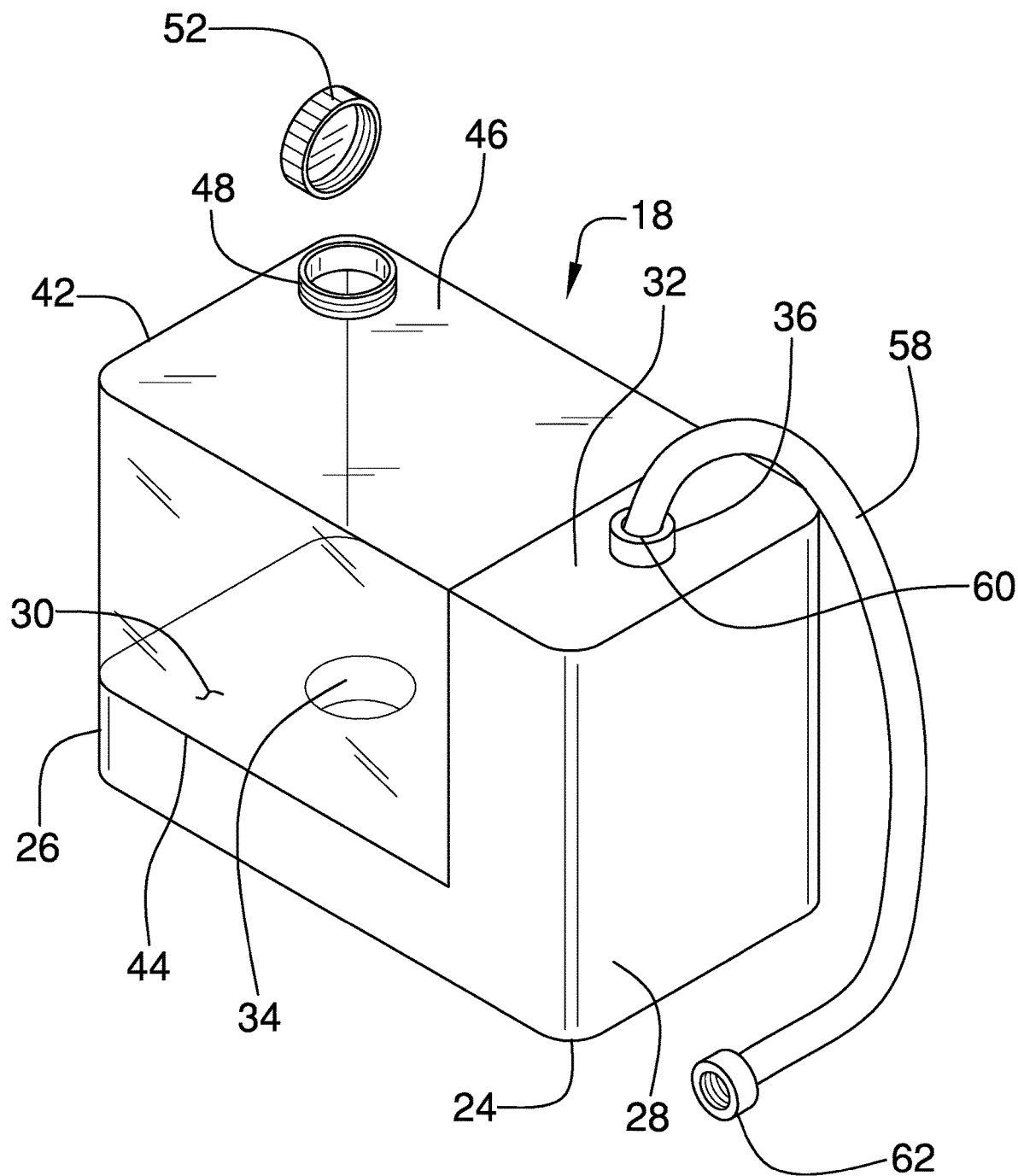
FIG. 2 is a front perspective view of an embodiment of the disclosure.
Figure 3:
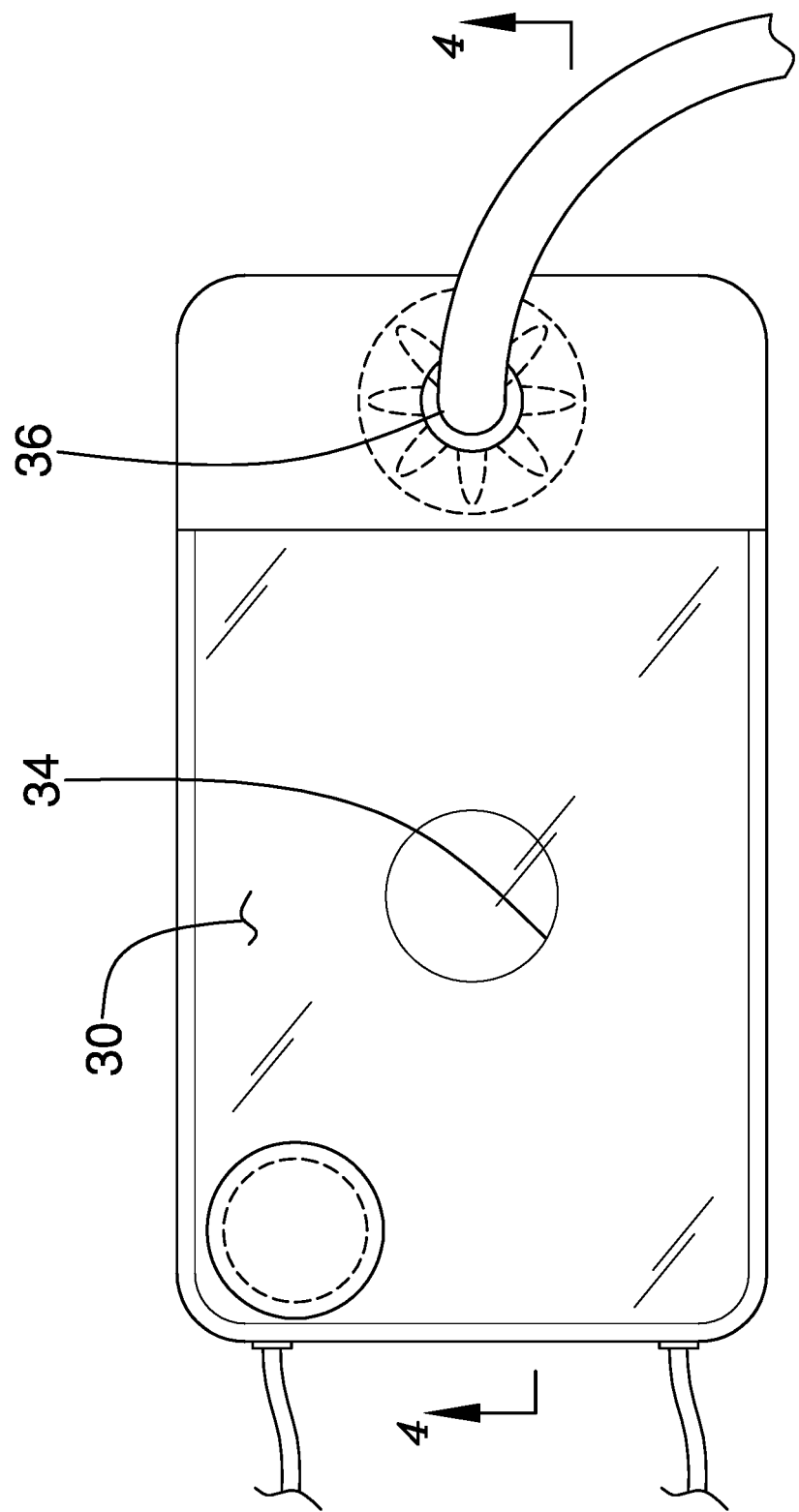
FIG. 3 is a top phantom view of an embodiment of the disclosure.
Figure 4:
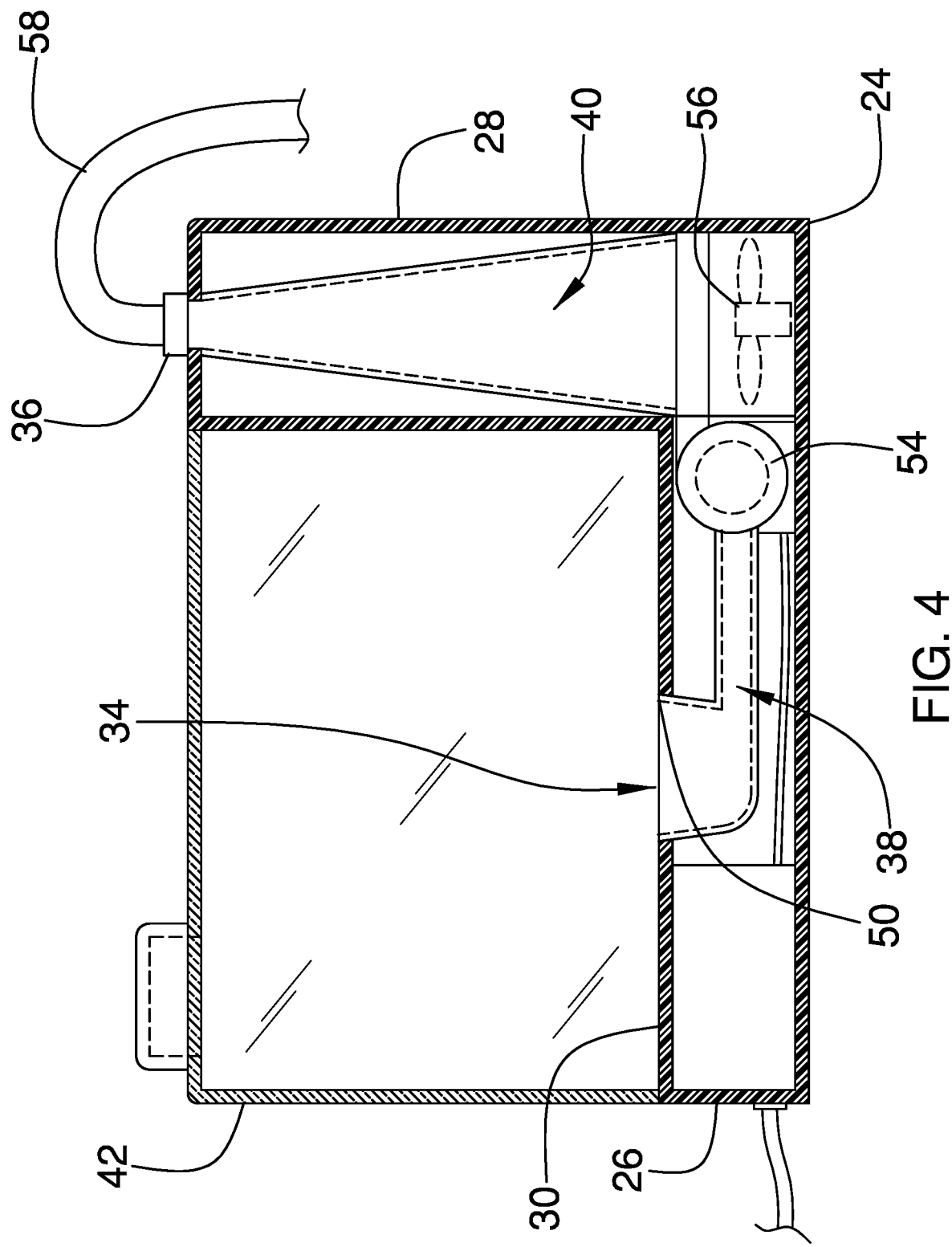
FIG. 4 is a cross sectional view taken along line 4-4 of FIG. 3 of an embodiment of the disclosure.
Figure 5:
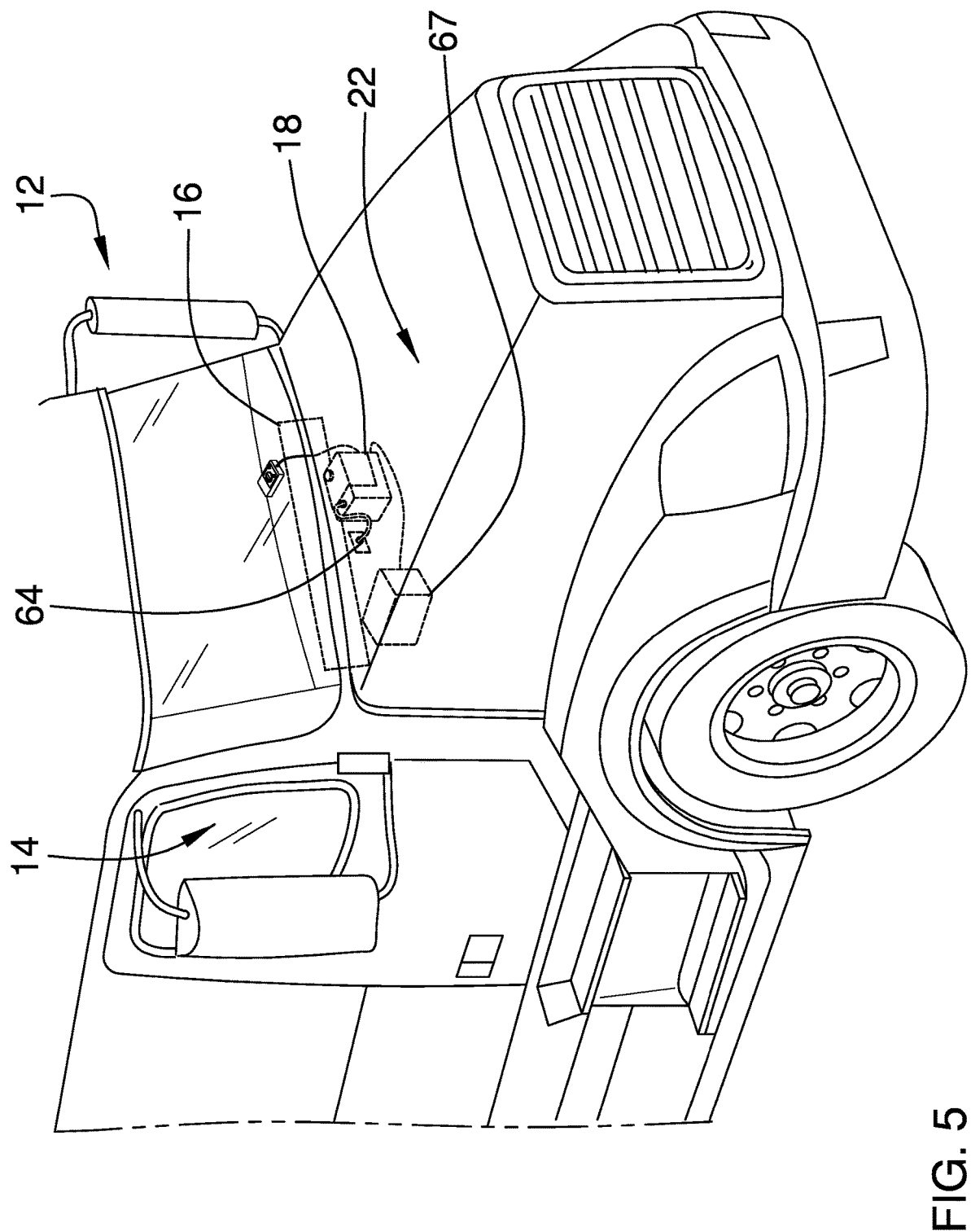
FIG. 5 is a perspective in-use view of an embodiment of the disclosure.

With reference now to the drawings, and in particular to FIGS. 1 through 5 thereof, a new humidification device embodying the principles and concepts of an embodiment of the disclosure and generally designated by the reference numeral 10 will be described.

As best illustrated in FIGS. 1 through 5, the vehicle humidification assembly 10 generally comprises a vehicle 12 that has a cabin 14 and an air conditioning system 16. A humidification unit 18 is positioned in the vehicle 12 and the humidification unit 18 contains a fluid 20 such that the humidification unit 18 vaporizes the fluid 20 when the humidification unit 18 is turned on. Furthermore, the humidification unit 18 is positioned in the engine bay 22 of the vehicle 12 and the humidification unit 18 is in fluid communication with the air conditioning system 16 in the vehicle 12. In this way the humidification unit 18 can release the vaporized fluid 20 into the air conditioning system 16 for humidifying an interior of the cabin 14 to enhance comfort for a driver of the vehicle 12. The vehicle 12 may comprise a semi tractor or other type of motorized vehicle that is driven on public roadways.

The humidification unit 18 comprises a housing 24 that has a reservoir platform 26 and an exhaust tower 28. The reservoir platform 26 has a top surface 30 and the exhaust tower 28 has a top end 32. The housing 24 has a fluid inlet 34 extending through the top surface 30 of the reservoir platform 26 and the housing 24 has a vapor outlet 36 extending through the top end 32 of the exhaust tower 28. Furthermore, the housing 24 has a vaporizer chamber 38 integrated within the reservoir platform 26 and the vaporizer chamber 38 is in fluid communication with the fluid inlet 34. The housing 24 has an exhaust chamber 40 that is integrated into the exhaust tower 28 and the exhaust chamber 40 extends between the vaporizer chamber 38 and the vapor outlet 36. Furthermore, the exhaust chamber 40 tapers between the vaporizer chamber 38 and the vapor outlet 36.

The humidification unit 18 includes a reservoir 42 that has a bottom wall 44 and an upper wall 46. The reservoir 42 has a fill port 48 extending through the upper wall 46 thereby facilitating the reservoir 42 to be filled with the fluid 20 and the reservoir 42 has an outlet 50 extending through the bottom wall 44. The fill port 48 includes a cap 52 for opening and closing the fill port 48. The reservoir 42 is positionable on the reservoir platform 26 having the outlet 50 being fluid 20 coupled to the fluid inlet 34 thereby facilitating the fluid 20 in the reservoir 42 to enter into the vaporizer chamber 38.

The humidification unit 18 includes a vaporizer 54 positioned within the vaporizer chamber 38 and the vaporizer 54 is aligned with the exhaust chamber 40. The vaporizer 54 vaporizes the fluid 20 when the vaporizer 54 is turned on such that the vaporized fluid 20 travels upwardly through the exhaust chamber 40. The vaporizer 54 may comprise a hypersonic vaporizer or other type of electronic vaporizer and the fluid 20 may comprise water. The humidification unit 18 includes a blower 56 that is positioned within the exhaust chamber 40. The blower 56 urges air upwardly through the exhaust chamber 40 and outwardly through the vapor outlet 36 when the blower 56 is turned on. The blower 56 is in fluid communication with the vaporizer 54 thereby facilitating the blower 56 to urge the vaporized fluid 20 outwardly through the vapor outlet 36. The blower 56 may comprise an electric fan or other type of electronic blower.

The humidification unit 18 includes a vapor hose 58 that has a first end 60 and a second end 62. The first end 60 is fluidly coupled to the vapor outlet 36 on the top wall of the exhaust tower 28 of the housing 24 such that the vapor hose 58 receives the vaporized fluid 20 from the exhaust chamber 40. The second end 62 is fluidly coupled to a vent 64 of the air conditioning system 16 in the vehicle 12 thereby facilitating the vent 64 to receive the vaporized fluid 20 for humidifying the cabin 14 when the air conditioning system 16 is turned on. A power cord 66 is coupled to and extends away from the housing 24 and the power cord 66 is electrically coupled to the vaporizer 54 and the blower 56. Additionally, the power cord 66 is electrically coupled to a power source 67 comprising an electrical system of the vehicle 12.

A control 68 is positioned within the cabin 14 such that the control 68 is accessible to the driver. The control 68 is in communication with the humidification unit 18 for turning the humidification unit 18 on and off. The control 68 comprises a control panel 70 that has a top side 72 and a conductor 74 that is electrically coupled between the control panel 70 and each of the vaporizer 54 and the blower 56. The control 68 includes a fan control 76 that is movably integrated into the control panel 70, and the fan control 76 is electrically coupled to the conductor 74 for turning the blower 56 on and off. The control 68 includes a vaporizer control 78 that is movably integrated into the control panel 70, and the vaporizer control 78 is electrically coupled to the conductor 74 for turning the vaporizer 54 on and off.

In use, the reservoir 42 is filled with the fluid 20 and the control 68 is manipulated to turn on one or both of the vaporizer 54 and the blower 56. In this way the vaporized fluid 20 can be delivered into the air conditioning system 16 for humidifying the cabin 14 of the vehicle 12. Thus, the driver can enjoy relief from dry airways, dry skin and other discomforts that can result from being exposed to dry air. Additionally, the humidification unit 18 reduces the buildup of static electricity that commonly occurs with dry air.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A vehicle humidification assembly for humidifying a cabin of a vehicle through the vehicle's existing air conditioning system, said assembly comprising:

a vehicle having a cabin and an air conditioning system;

a humidification unit being positioned in said vehicle, said humidification unit containing a fluid such that said humidification unit vaporizes the fluid when said humidification unit is turned on, said humidification unit being in fluid communication with said air conditioning system in said vehicle thereby facilitating said humidification unit to release the vaporized fluid into said air conditioning system for humidifying an interior of said cabin wherein said humidification unit is configured to enhance comfort for a driver of said vehicle;

a control being positioned within said cabin such that said control is accessible to the driver, said control being in communication with said humidification unit for turning said humidification unit on and off; and wherein said humidification unit comprises a housing having a reservoir platform and an exhaust tower, said reservoir platform having a top surface, said exhaust tower having a top end, said housing having a fluid inlet extending through said top surface of said reservoir platform, said housing having a vapor outlet extending through said top end of said exhaust tower, said housing having a vaporizer chamber being integrated within said reservoir platform, said vaporizer chamber being in fluid communication with said fluid inlet, said housing having an exhaust chamber being integrated into said exhaust tower, said exhaust chamber extending between said vaporizer chamber and said vapor outlet, said exhaust chamber tapering between said vaporizer chamber and said vapor outlet.

2. The assembly according to claim 1, wherein said humidification unit includes a reservoir having a bottom wall and an upper wall, said reservoir having a fill port extending through said upper wall thereby facilitating said reservoir to be filled with the fluid, said reservoir having an outlet extending through said bottom wall, said reservoir being positionable on said reservoir platform having said outlet being fluid coupled to said fluid inlet thereby facilitating the fluid in said reservoir to enter into said vaporizer chamber.

3. The assembly according to claim 1, wherein said humidification unit includes a vaporizer being positioned within said vaporizer chamber, said vaporizer being aligned with said exhaust chamber, said vaporizer vaporizing the fluid when said vaporizer is turned on such that the vaporized fluid travels upwardly through said exhaust chamber.

4. The assembly according to claim 3, wherein said humidification unit includes a blower being positioned within said exhaust chamber, said blower urging air upwardly through said exhaust chamber and outwardly through said vapor outlet when said blower is turned on, said blower being in fluid communication with said vaporizer thereby facilitating said blower to urge the vaporized fluid outwardly through said vapor outlet.

5. The assembly according to claim 2, wherein said humidification unit includes a vapor hose having a first end and a second end, said first end being fluidly coupled to said vapor outlet on said top wall of said exhaust tower of said housing such that said vapor hose receives the vaporized fluid from said exhaust chamber, said second end being fluidly coupled to a vent of said air conditioning system in said vehicle thereby facilitating said vent to receive the vaporized fluid for humidifying said cabin when said air conditioning system is turned on.

6. The assembly according to claim 2, wherein said humidification unit includes a power cord being coupled to and extending away from said housing, said power cord being electrically coupled to said vaporizer and said blower, said power cord being electrically coupled to a power source comprising an electrical system of said vehicle.

7. The assembly according to claim 4, wherein said control comprises:
a control panel having a top side;
a conductor being electrically coupled between said control panel and each of said vaporizer and said blower;
a fan control being movably integrated into said control panel, said fan control being electrically coupled to said conductor for turning said blower on and off; and
a vaporizer control being movably integrated into said control panel, said vaporizer control being electrically coupled to said conductor for turning said vaporizer on and off.

8. A vehicle humidification assembly for humidifying a cabin of a vehicle through the vehicle's existing air conditioning system, said assembly comprising:
a vehicle having a cabin and an air conditioning system;
a humidification unit being positioned in said vehicle, said humidification unit containing a fluid such that said humidification unit vaporizes the fluid when said humidification unit is turned on, said humidification unit being in fluid communication with said air conditioning system in said vehicle thereby facilitating said humidification unit to release the vaporized fluid into said air conditioning system for humidifying an interior of said cabin wherein said humidification unit is configured to enhance comfort for a driver of said vehicle, said humidification unit comprising:
a housing having a reservoir platform and an exhaust tower, said reservoir platform having a top surface, said exhaust tower having a top end, said housing having a fluid inlet extending through said top surface of said reservoir platform, said housing having a vapor outlet extending through said top end of said exhaust tower, said housing having a vaporizer chamber being integrated within said reservoir platform, said vaporizer chamber being in fluid communication with said fluid inlet, said housing having an exhaust chamber being integrated into said exhaust tower, said exhaust chamber extending between said vaporizer chamber and said vapor outlet, said exhaust chamber tapering between said vaporizer chamber and said vapor outlet;
a reservoir having a bottom wall and an upper wall, said reservoir having a fill port extending through said upper wall thereby facilitating said reservoir to be filled with the fluid, said reservoir having an outlet extending through said bottom wall, said reservoir being positionable on said reservoir platform having said outlet being fluid coupled to said fluid inlet thereby facilitating the fluid in said reservoir to enter into said vaporizer chamber;
a vaporizer being positioned within said vaporizer chamber, said vaporizer being aligned with said exhaust chamber, said vaporizer vaporizing the fluid when said vaporizer is turned on such that the vaporized fluid travels upwardly through said exhaust chamber;
a blower being positioned within said exhaust chamber, said blower urging air upwardly through said exhaust chamber and outwardly through said vapor outlet when said blower is turned on, said blower being in fluid communication with said vaporizer thereby facilitating said blower to urge the vaporized fluid outwardly through said vapor outlet;
a vapor hose having a first end and a second end, said first end being fluidly coupled to said vapor outlet on said top wall of said exhaust tower of said housing such that said vapor hose receives the vaporized fluid from said exhaust chamber, said second end being fluidly coupled to a vent of said air conditioning system in said vehicle thereby facilitating said vent to receive the vaporized fluid for humidifying said cabin when said air conditioning system is turned on; and
a power cord being coupled to and extending away from said housing, said power cord being electrically coupled to said vaporizer and said blower, said power cord being electrically coupled to a power source comprising an electrical system of said vehicle; and
a control being positioned within said cabin such that said control is accessible to the driver, said control being in communication with said humidification unit for turning said humidification unit on and off, said control comprising:
a control panel having a top side;
a conductor being electrically coupled between said control panel and each of said vaporizer and said blower;

a fan control being movably integrated into said control panel, said fan control being electrically coupled to said conductor for turning said blower on and off; and a vaporizer control being movably integrated into said control panel, said vaporizer control being electrically coupled to said conductor for turning said vaporizer on and off.

* * * * *